United States Patent [19]
Yoshida et al.

[11] Patent Number: 5,604,672
[45] Date of Patent: Feb. 18, 1997

[54] INVERTER APPARATUS FOR AIR CONDITIONER

[75] Inventors: Makoto Yoshida, Kusatsu; Naomi Goto, Kurita-gun, both of Japan

[73] Assignee: Matsushita Electric Industrial Co., Inc., Osaka, Japan

[21] Appl. No.: 526,520

[22] Filed: Sep. 11, 1995

[30] Foreign Application Priority Data

Sep. 16, 1994 [JP] Japan .................................. 6-220709

[51] Int. Cl.⁶ .................. H02M 3/24; H02P 5/28
[52] U.S. Cl. .................. 363/97; 363/41; 318/811
[58] Field of Search ............... 363/8, 41, 97; 318/811

[56] References Cited

U.S. PATENT DOCUMENTS 4,315,203  2/1982  Ibamoto et al. .................. 318/807
4,678,063  7/1987  Kitaoka et al. .................. 187/296
4,924,168  5/1990  Horie et al. ..................... 363/41
5,072,354 12/1991  Katto et al. ..................... 363/98
5,086,266  2/1992  Shiga et al. ..................... 322/28
5,519,301  5/1996  Yoshida et al. .................. 363/41

*Primary Examiner*—Stuart N. Hecker
*Attorney, Agent, or Firm*—Panitch Schwarze Jacobs & Nadel, P.C.

[57] ABSTRACT

In an inverter apparatus for air conditioner for converting DC voltage supplied from a DC power source into pseudo AC voltage of variable voltage and variable frequency by means of pulse-width modulation, a control circuit varies pulse-widths of the pseudo AC voltage in response to degree of rise/drop of the DC voltage from the nominal DC voltage; and when the voltage has an insufficient value to obtain the frequency-voltage characteristic, the control circuit controls switching devices to issue a maximum AC voltage obtained by the present DC voltage independent of frequency.

5 Claims, 9 Drawing Sheets

$\sqrt{2}t_1$  $\sqrt{2}t_2$  $\sqrt{2}t_3$  $\sqrt{2}t_4$  $\sqrt{2}t_5$

FIG. 14

$\sqrt{2}t_1$  $\sqrt{2}t_2$  $\sqrt{2}t_3$  $\sqrt{2}t_4$  $\sqrt{2}t_5$ 5,604,672

INVERTER APPARATUS FOR AIR CONDITIONER

FIELD OF THE INVENTION AND RELATED ART STATEMENT

1. Field of the Invention

The present invention relates to an inverter apparatus for driving a compressor of air conditioner under a condition where voltage of a power supply may greatly fluctuate.

2. Description of the Related Art

In recent years, an inverter is employed in an indoor type air conditioner. When AC commercial power is being supplied to the inverter, a stable air conditioning performance is obtained to realize a proper air condition. However, it is difficult to obtain the stable air conditioning performance in an air conditioner for automobile which is supplied with a fluctuating voltage of a DC power source.

Figure 10:
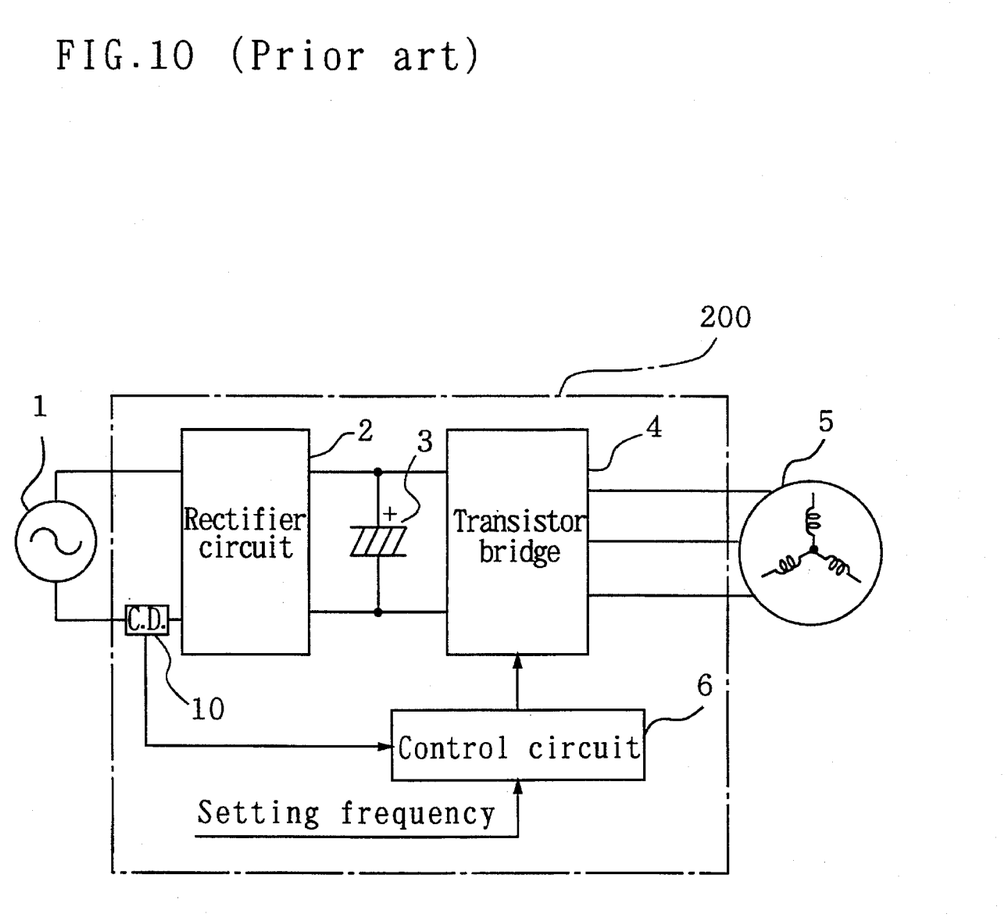
FIG. 10 is a circuit diagram showing the generally known basic inverter drive circuit for a motor employed in the conventional indoor type air conditioner.

FIG. 10 is a circuit diagram showing the generally known basic inverter drive circuit for a motor employed in the conventional indoor type air conditioner. In FIG. 10, a rectifier circuit 2 is supplied with AC voltage from an AC commercial power 1. A current detector 10 detects a current flowing into the rectifier circuit 2 from the AC commercial power 1. An AC voltage input to the rectifier circuit 2 is rectified, and a rectified voltage is smoothed by a capacitor 3. A resultant DC voltage is input to a transistor bridge 4 and is subjected to the known switching operation by the transistor bridge 4.

The transistor bridge 4 consists of six transistors (not shown) and converts the DC voltage into three-phase pseudo sine wave voltage having pulse-width-modulated waveform of variable voltage and variable frequency. A compressor 5 including an induction motor is driven by the above-mentioned three-phase pseudo sine wave voltage. An output signal of the current detector 10 is supplied to a control circuit 6 which controls the transistor bridge 4.

In an air conditioning control system (not shown) connected to an inverter apparatus 200, several environmental conditions (e.g. temperature, humidity) are detected, and a setting frequency for the compressor 5 is determined. This setting frequency is supplied to the control circuit 6 as a designated value.

Figure 11:
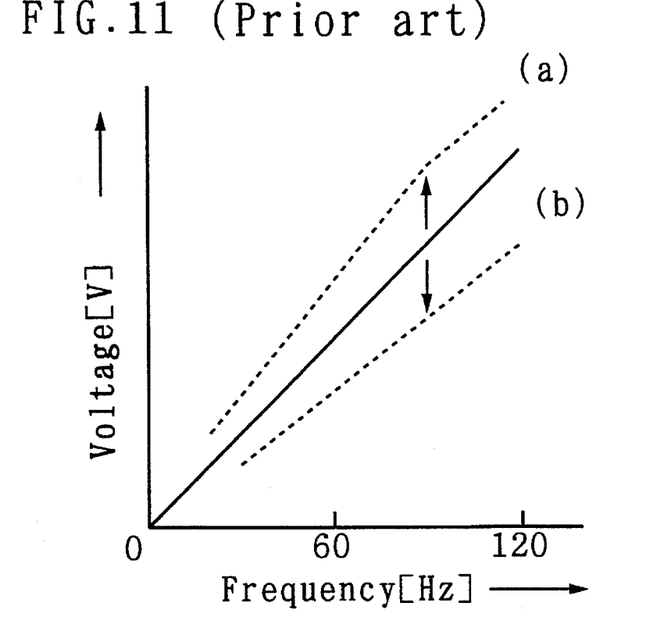
FIG. 11 and FIG. 12 are graphs each showing a relationship between frequency and voltage in the conventional inverter apparatus.
Figure 12:
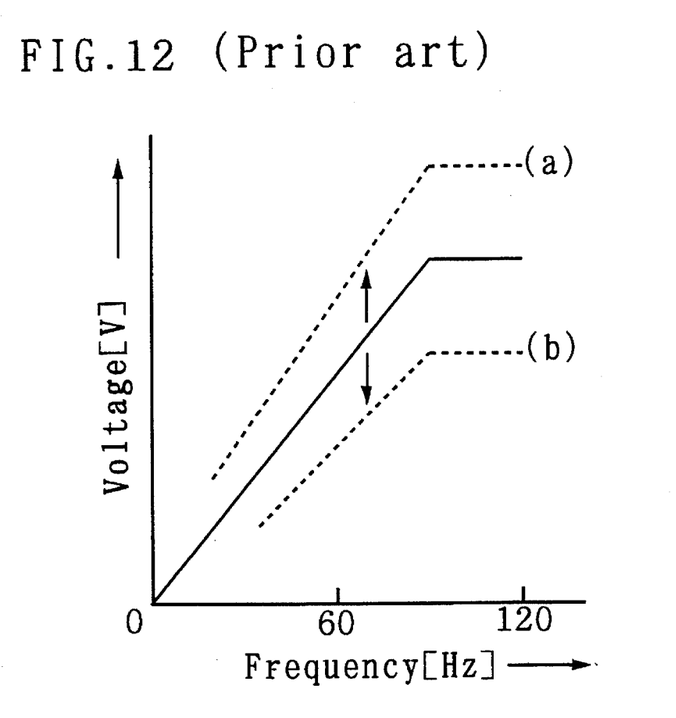

FIG. 11 and FIG. 12 are graphs each showing a relationship between frequency and voltage set by the control circuit 6 (FIG. 10). When a voltage of the AC commercial power 1 (FIG. 10) is within a normal range, the frequency-voltage characteristics are shown by solid lines in FIG. 11 and FIG. 12. These frequency-voltage characteristics are selected by referring to a specification of the motor and a loaded torque of the compressor 5 (FIG. 10) so as to efficiently drive the compressor 5. Output signals issued from the control circuit 6 are given to the bases (not shown) of the transistor bridge 4 so as to obtain the above-mentioned frequency-voltage characteristic.

Since the AC commercial power 1 offers a very stable voltage, a voltage fluctuation is approximately ±5% at 100 volts in single phase and is approximately ±10% at 200 volts in three-phase. Therefore, an output voltage issued from the transistor bridge 4 fluctuates only within a range of approximately ±5 to 10% of the nominal voltage. In this small voltage fluctuation, the compressor 5 can be stably driven with no necessity of consideration to the fluctuation of input voltage.

However, when a voltage of the power source greatly fluctuates, an output voltage of the inverter apparatus also greatly fluctuates. For instance, voltage fluctuation of DC batteries mounted in an electric vehicle is considerably large. When the vehicle is picking up speed, a main drive motor consumes a large power such as several tens kilowatt. Therefore, voltage of the power source greatly drops. When the vehicle is reducing its speed, regenerative braking is executed. Therefore, voltage of the power source greatly rises. Further, voltage of the power source greatly rises when the batteries are being charged, and the voltage still rises greatly just after completion of the charge. In the above-mentioned state, a voltage fluctuation expands up to approximately ±30% of the nominal voltage when a power source is a lead acid battery.

When a voltage of the power source rises, an input voltage to the compressor 5 (FIG. 10) also rises as shown by dotted lines "a" in FIG. 11 and FIG. 12. Therefore, the motor mounted in the compressor 5 becomes over-excited, and a magnetic circuit comes to a state of magnetic saturation. As a result, a current flowing in the motor rapidly increases, and an efficiency of the motor is thereby lowered, and further, the compressor 5 may stops.

When a voltage of the power source drops, an input voltage to the compressor 5 also drops as shown by dotted lines "b" in FIG. 11 and FIG. 12. Therefore, the motor mounted in the compressor 5 cannot generate sufficient torque. As a result, a current flowing in the motor rapidly increases, and an efficiency of the motor is thereby lowered. Further, the motor may get damaged by heat, or a protection device may operate to stop the compressor 5. Once the compressor 5 for air conditioner has stopped, it is not possible to quickly re-start the compressor 5 because of a pressure difference left between a discharge pressure and an intake pressure. When the pressure difference decreases entirely, re-start of the compressor is carried out. However, at that time, a room temperature in the vehicle has already risen, and a temperature of the beginning air blow can not be kept cold like that before the stoppage of the compressor 5. The comforts of air condition is thus spoiled.

OBJECT AND SUMMARY OF THE INVENTION

An object of the present invention is to offer an inverter apparatus by which the compressor is driven with high efficiency and good stableness even when a voltage of the power source greatly fluctuates.

In order to achieve the above-mentioned object, an inverter apparatus for air conditioner of the present invention, which is for converting DC voltage supplied from a DC power source into pseudo AC voltage of variable voltage and variable frequency by means of pulse-width modulation, comprises:

switching means for making switching operation to a DC voltage supplied thereto;

voltage detection means for detecting a DC voltage applied to the switching means; and     control means for controlling the switching means to generate a pulse train whose pulse-width is modulated with a predetermined frequency-voltage characteristic; wherein     the control means refers to pulse-widths of the pulse train for holding the frequency-voltage characteristic when the DC voltage is a nominal DC voltage of the DC power source, and the control means varies the pulse-widths in response to degree of variation of the DC voltage against the nominal DC voltage, and when said DC voltage has an insufficient value to obtain the frequency-voltage characteristic, the control means controls the switching means to issue a maximum AC voltage obtained by the value of the DC voltage independent of frequency.

According to the above-mentioned inverter apparatus, even when a DC voltage of the power source greatly varies, it is possible to realize stable and efficient driving of a compressor connected to the inverter. Since undesirable stop of the compressor is prevented, comfortable air-conditioning is realized.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, a preferred embodiment of the present invention will be described with reference to the accompanying drawings.

Figure 1:
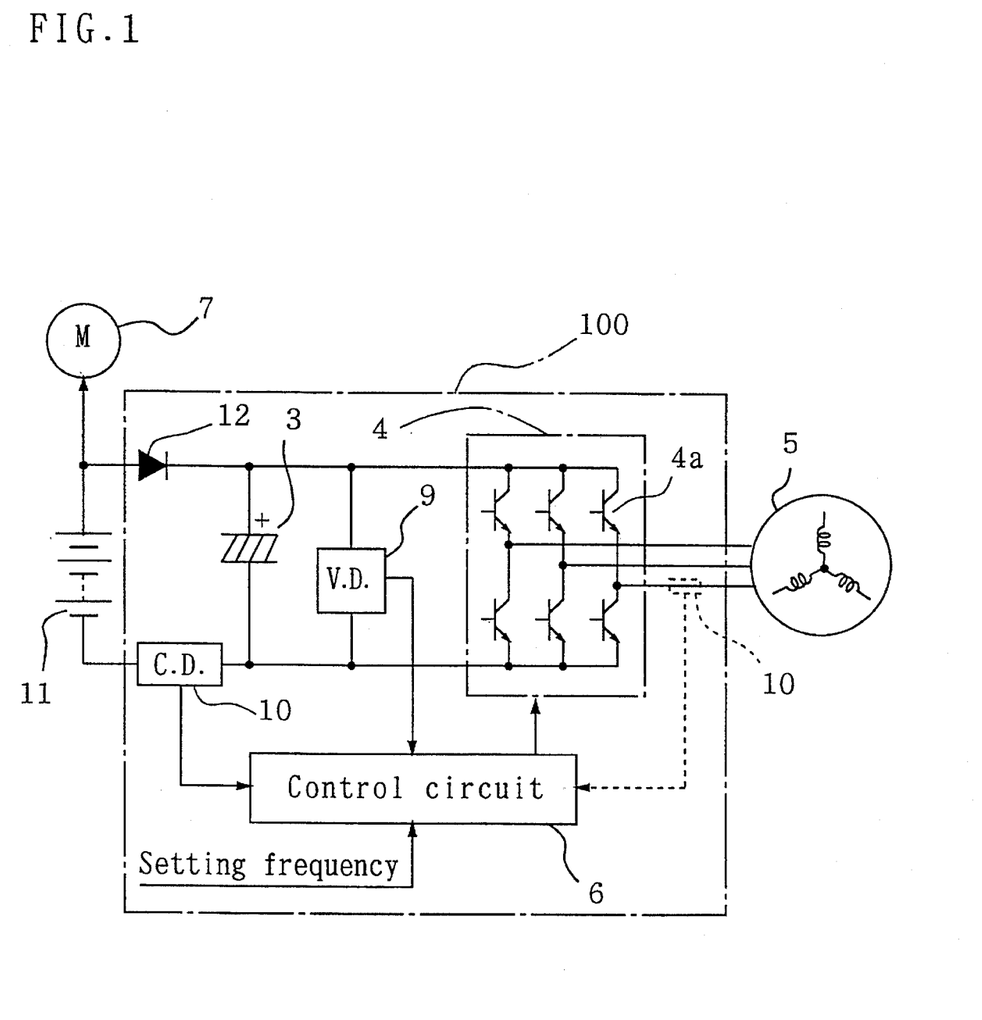
FIG. 1 is a circuit diagram showing an inverter apparatus for air conditioner mounted in an electric vehicle.

FIG. 1 is a circuit diagram showing an inverter apparatus for air conditioner mounted in an electric vehicle.

In FIG. 1, power of a DC battery 11 is supplied to a compressor 5 including an induction motor via an inverter apparatus 100. A main motor 7 for moving the vehicle is supplied with power from the battery 11. A rectifier 12 is provided to prohibit inverse current-flow from a capacitor 3 to the battery 11. Rapid fluctuation of an output voltage of the battery 11 is smoothed to a certain extent by the capacitor 3. A voltage detector 9 is connected in parallel with a transistor bridge 4, and an output signal of the voltage detector 9, which corresponds to an input voltage for the transistor bridge 4, is given to a control circuit 6. The control circuit 6 controls the transistor bridge 4 to execute the known switching operation of variable voltage and variable frequency. The control circuit 6 includes therein a CPU and memories for executing the above-mentioned switching operation.

A current flowing in the transistor bridge 4 is detected by a current detector 10. An output signal of the current detector 10, which corresponds to the current flowing in the transistor bridge 4, is given to the control circuit 6. A setting frequency is supplied from an air-conditioning control system (not shown) to the control circuit 6. The transistor bridge 4 consists of six transistors 4a and converts the DC voltage into three-phase pseudo sine wave voltage having pulse-width-modulated waveform. The compressor 5 including the induction motor is driven by the above-mentioned three-phase pseudo sine wave voltage. The current detector 10 may be provided on an output line of the transistor bridge 4 as shown by dotted lines instead of provision on an input line of the transistor bridge 4.

Since a voltage of the battery 11 varies by a very large extent dependent on a driving state of the vehicle, the input voltage for the transistor bridge 4 also varies within a very large extent. The voltage detector 9 is therefore provided to always observe the input voltage. When the control circuit 6 generates a base control signal for the transistors 4a, this base control signal is controlled so that an output voltage of the transistor bridge 4 will be corrected in compliance with the DC voltage detected by the voltage detector 9. An output voltage characteristic is thereby maintained in substantially uniform even when voltage of the battery 10 varies. The current detector 10 detects a current required to drive the compressor 5. When a detected current exceeds an allowable value, the control circuit 6 lowers its output frequency with the priority over the setting frequency supplied from the air-conditioning control system, thereby to keep a current consumed in the transistor bridge 4 (or a current consumed in the compressor 5) below the allowable value. Otherwise, the control circuit 6 restricts the maximum frequency.

Hereafter, operation of the inverter apparatus 100 will be described concretely.

Figure 2:
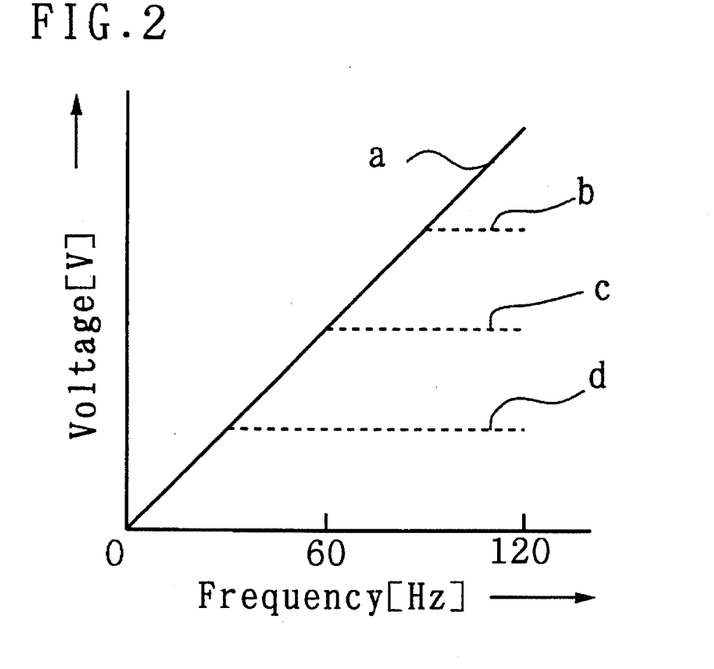
FIG. 2 is a graph showing an example of frequency-voltage characteristic.

FIG. 2 is a graph showing an example of frequency-voltage characteristic. In FIG. 2, when the DC voltage detected by the voltage detector 9 is high enough to obtain a predetermined AC voltage, the compressor 5 is driven in accordance with a characteristic "a" shown by a solid line. When the DC voltage drops, the compressor 5 is driven in accordance with a modified characteristic "b", "c" or "d" in response to degree of voltage drop. As the voltage drop increases, the characteristic shifts from "b" to "c" and further to "d". A current flowing in the compressor 5 will increase in a high frequency region of the characteristics "b", "c" and "d" owing to lack of torque in case a load is large in the compressor 5. Then, according to the present invention, when the current exceeds a predetermined allowable value, the control is made to lower frequency as aforementioned. It is thereby possible to avoid stop of the compressor 5. On the other hand, when the load is comparatively small, frequency is not restricted even in the high frequency region of each of the characteristics "b", "c" and "d".

Figure 3:
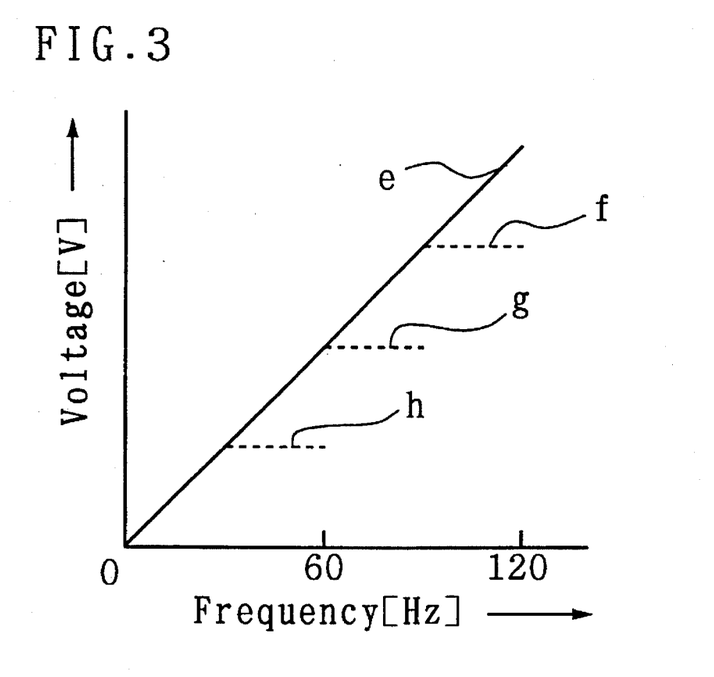
FIG. 3 is a graph showing another example of frequency-voltage characteristic.

FIG. 3 is a graph showing another example of frequency-voltage characteristic. In this characteristic, the maximum frequency is restricted as the alternative to the way of restricting the maximum current. In FIG. 3, when the DC voltage detected by the voltage detector 9 (FIG. 1) is high enough to obtain a predetermined AC voltage, the compressor 5 is driven in accordance with a characteristic "e" shown by a solid line. When the DC voltage drops, the compressor 5 is driven in accordance with a modified characteristic "f", "g" or "h" in response to degree of voltage drop. As the voltage drop increases, the characteristic shifts from "f" to "g" and further to "h". The maximum frequency is restricted in response to the degree of voltage drop. For example, the maximum frequency is limited up to approximately 60 Hz on the characteristic "h". Thus, increase of current is prevented even when the DC voltage drops, and it is possible to continuously drive the compressor 5 without undesirable stop.

Next, the control for realizing the characteristics of FIG. 2 and FIG. 3 will be described.

In generating pseudo AC voltage having pulse-width-modulated waveform by the inverter apparatus 100, when DC voltage of the battery 11 varied, the frequency-voltage characteristic would have varied its gradient as shown in FIG. 11 and FIG. 12. Variation of the gradient substantially corresponds to variation of a ratio $R_v$ of a nominal DC voltage and an actual DC voltage. This variation of gradient can be compensated by varying pulse-width with the ratio $R_v$. There is no limit in this correction when the DC voltage is increasing, whereas there is a limit when the DC voltage is dropping. That is, no matter how shape of pulse train for making pseudo AC voltage is changed, it will be impossible to generate an effective AC voltage which has a value of $(1/\sqrt{2} \times DC$ voltage) and more. For example, to obtain an AC voltage having an effective voltage 100 V, it is necessary to have the DC voltage of 141.4 V. Hereafter, this DC voltage (141.4 V) is defined as a DC voltage limit. The DC voltage limit is determined only by multiplying required pseudo AC voltage by $\sqrt{2}$.

In this embodiment, when an actual DC voltage for obtaining a pseudo AC voltage is equal to or larger than the DC voltage limit, shape of pulse for constituting a pseudo AC voltage is made to have a width obtained by multiplying a basic pulse-width by the ratio $R_v$. In case the actual DC voltage is lower than a nominal voltage $V_N$, a pulse-width is widened. At that time, it is preferable that the "wide" pulse does not overlap with the adjacent pulse which is also widened. However, inventors confirmed on experiments that desired pseudo AC voltage was obtained even though a certain amount of overlap of pulse occurs.

When an actual DC voltage for obtaining a pseudo AC voltage is lower than the DC voltage limit, the maximum pseudo AC voltage, which is obtainable by the present DC voltage, is issued independent of frequency. For instance, the maximum voltage is to be issued at 120 Hz according to the frequency-voltage characteristic. This maximum voltage is defined by a relation: (the nominal voltage $V_N$)/$\sqrt{2}$, and this is the maximum AC voltage obtained by the nominal voltage of the battery 11 (FIG. 1). Therefore, waveform of pulses are made in a form similar to the form for realizing 120 Hz frequency. Each pulse-width is obtained by multiplying a pulse-width at 120 Hz by a value of [120/frequency required].

Figure 4:
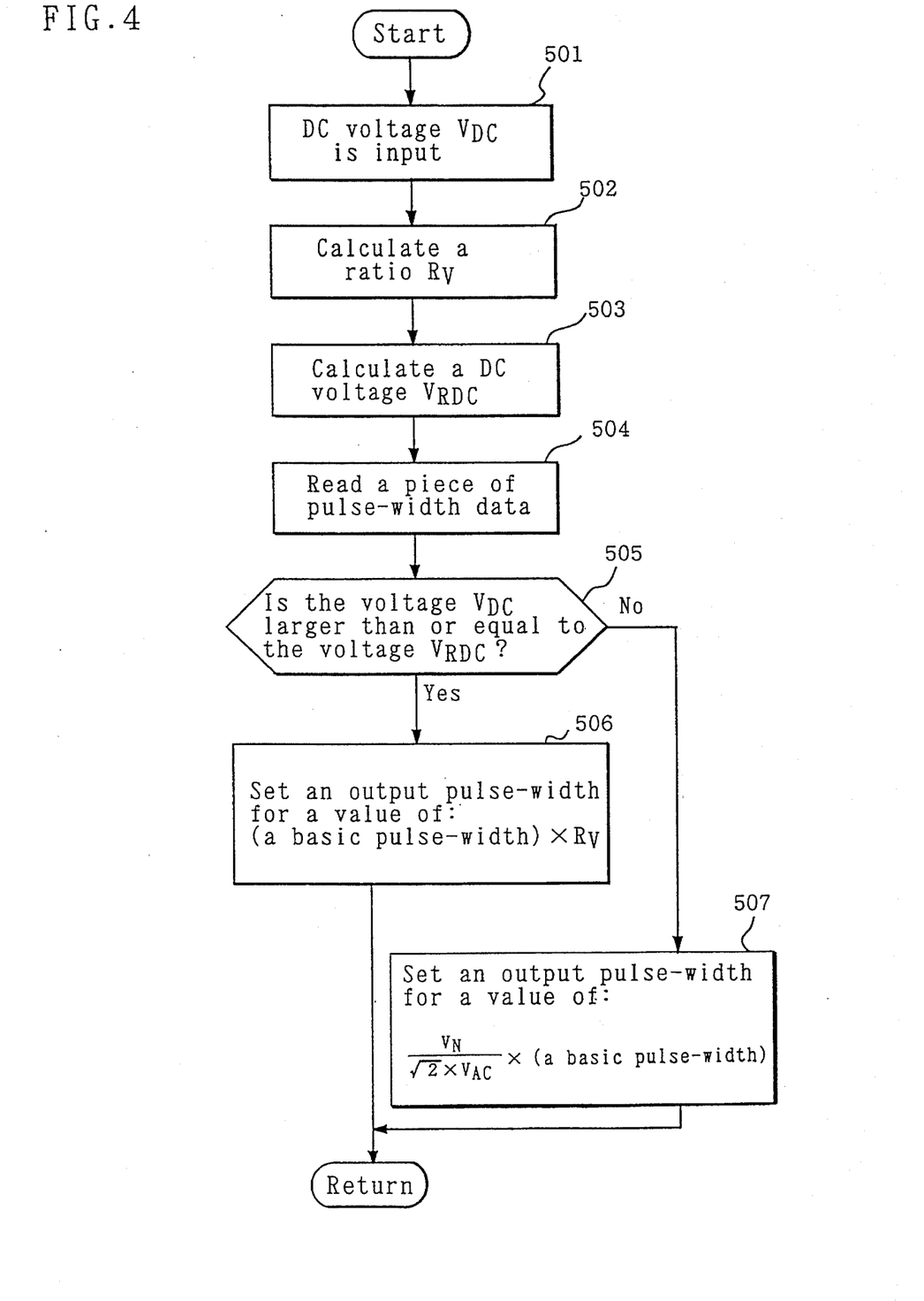
FIG. 4 is a flow chart showing a sub-routine for correcting the characteristic executed in a control circuit 6 in FIG. 1.

FIG. 4 is a flow chart showing a sub-routine for correcting the characteristic executed in the control circuit 6 (FIG. 1) when voltage of the battery 11 (FIG. 1) varies.

In a step 501, an actual DC voltage $V_{DC}$ is input to the control circuit 6 from the voltage detector 9. Next, in a step 502, calculation is executed to obtain a ratio $R_v$ of the nominal voltage $V_N$ and the DC voltage $V_{DC}$ (i.e., $R_v = V_N/V_{DC}$). In a step 503, calculation is executed to obtain the lowest DC voltage $V_{RDC}$ required to generate a voltage to be applied to the compressor 5. This DC voltage $V_{RDC}$ is just the DC voltage limit as aforementioned and is obtained by multiplying the necessary pseudo effective AC voltage by $\sqrt{2}$. Next, in a step 504, read-in of a piece of pulse-width data, which is determined in compliance with frequency, is executed. These data have been stored in a ROM beforehand. In a step 505, judgment is made whether the actual DC voltage $V_{DC}$ is larger than or equal to the aforementioned voltage $V_{RDC}$. When the actual DC voltage $V_{DC}$ is larger than or equal to the voltage $V_{RDC}$, step advance to a step 506 is executed. In the step 506, an output pulse-width is set for a value of $t_x \times R_v$, wherein $t_x$ is a basic pulse-width at the desired frequency. Next, return to the known main routine for making the switching operation of the transistor bridge 4 is executed.

When the actual voltage $V_{DC}$ is not larger than the voltage $V_{RDC}$, step advance to a step 507 is executed. In the step 507, an output pulse-width is set for a value of: $\{V_N/(\sqrt{2} \times V_{AC}) \times \text{(the basic pulse-width)}\}$, wherein $V_{AC}$ is a required AC voltage, and the DC voltage $V_{DC}$ constitutes a pseudo AC voltage. This pseudo AC voltage is constant voltage independent of frequency. According to the above-mentioned control operation, when the voltage of the power source fluctuates to lead a state that the voltage $V_{DC}$ is larger than or equal to the voltage $V_{RDC}$, the frequency-voltage characteristic is kept equal to that written by the solid line in FIG. 2 which is the characteristic under the nominal DC voltage. When the voltage $V_{DC}$ is not larger than the voltage $V_{RDC}$, the voltage of correction limit is issued independent of frequency as shown by the dotted lines in FIG. 2.

FIG. 5, FIG. 6, FIG. 7 and FIG. 13 are graphs each showing a pseudo AC voltage waveform for one phase in the inverter apparatus 100 (FIG. 1) of the present invention. Each of the waveforms is a pulse train in which pulse-width modulation is executed. Pulse-width is corrected in response to variation of the voltage $V_{DC}$, and this correction corresponds to the step 506 (FIG. 4).

Figure 5:
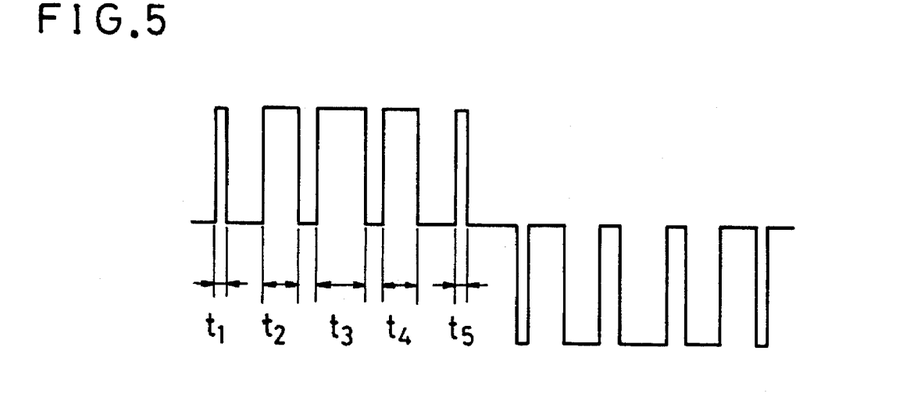
FIG. 5, FIG. 6 and FIG. 7 are graphs each showing a pseudo AC voltage waveform for one phase in the inverter apparatus of the present invention.

The waveform shown in FIG. 5 is issued when the DC voltage $V_{DC}$ is equal to the nominal voltage 200 V. In this waveform, pulse-widths for constituting the waveform are respectively made equal to the basic pulse-widths $t_1$, $t_2$, $t_3$, $t_4$ and $t_5$ which are determined in dependence on frequency. An effective value $V_{AC}$ of an output voltage is 100 V in this waveform.

Figure 6:
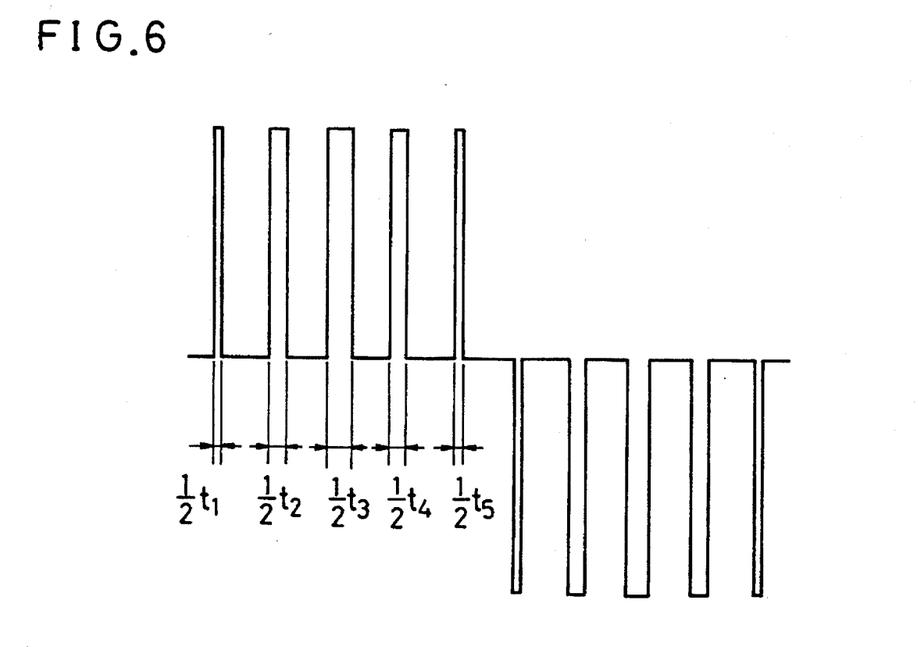

When the DC voltage $V_{DC}$ rises up to 400 V, the waveform shown in FIG. 6 is issued. In this waveform, pulse height (amplitude) is twice as large as that in FIG. 5, and respective pulse-widths are half the basic pulse-widths. That is, the pulse-widths are $(1/2)t_1$, $(1/2)t_2$, $(2/1)t_3$, $(2/1)t_4$ and $(1/2)t_5$. An effective value $V_{AC}$ is also 100 V in this waveform.

Figure 7:
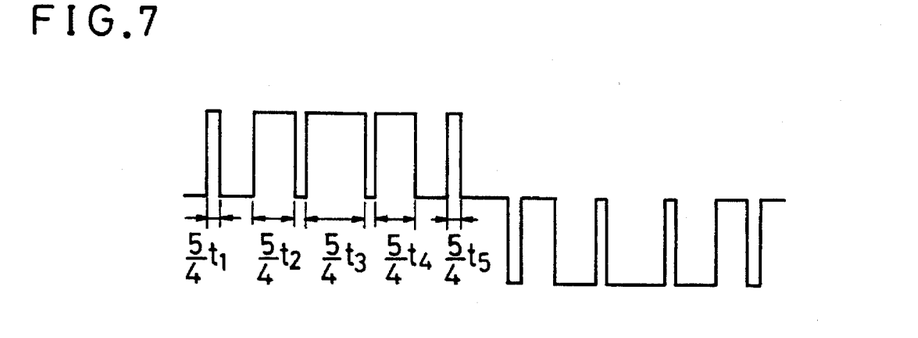

When the DC voltage $V_{DC}$ drops to 160 V, the waveform shown in FIG. 7 is issued. In this waveform, pulse height (amplitude) is 160/200 (=4/5) times as large as that in FIG. 5, and respective pulse-widths are 5/4 of the basic pulse-widths. That is, the pulse-widths are $(5/4)t_1$, $(5/4)t_2$, $(5/4)t_3$, $(5/4)t_4$ and $(5/4)t_5$. An effective value $V_{AC}$ is also 100 V in this waveform.

Figure 13:
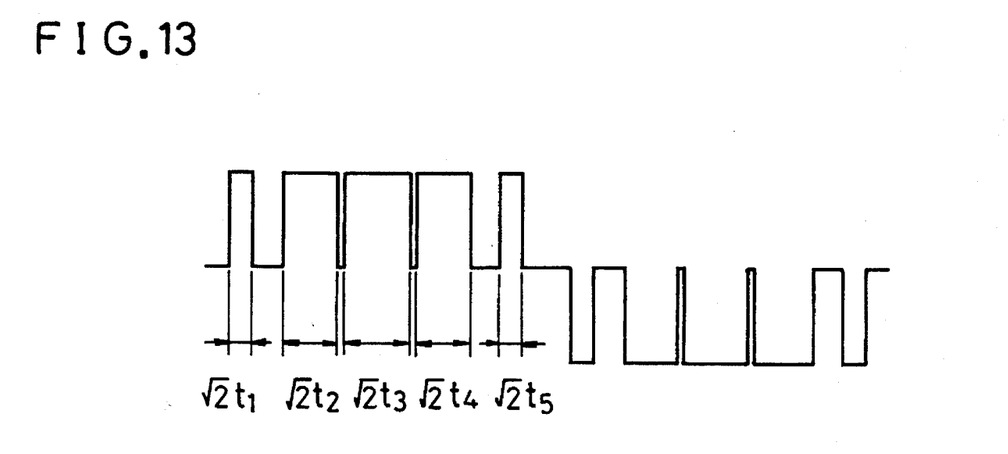
FIG. 13 and FIG. 14 are graphs each showing a pseudo AC voltage waveform for one phase in the inverter apparatus of the present invention.

When the DC voltage $V_{DC}$ further drops to 141.4 V, the waveform shown in FIG. 13 is issued. In this waveform, pulse height (amplitude) is 141.4/200 (=1/$\sqrt{2}$) times as large as that in FIG. 5, and respective pulse-widths are $\sqrt{2}$ times as large as the basic pulse-widths. That is, the pulse-widths are $(\sqrt{2})t_1$, $(\sqrt{2})t_2$, $(\sqrt{2})t_3$, $(\sqrt{2})t_4$ and $(\sqrt{2})t_5$. An effective value $V_{AC}$ is still 100 V in this waveform.

As has been described, by varying pulse-width in response to variation of the DC voltage $V_{DC}$, it is possible to supply the compressor 5 (FIG. 1) with the AC voltage having a constant effective voltage $V_{AC}$ even when the DC voltage $V_{DC}$ varies.

Figure 14:
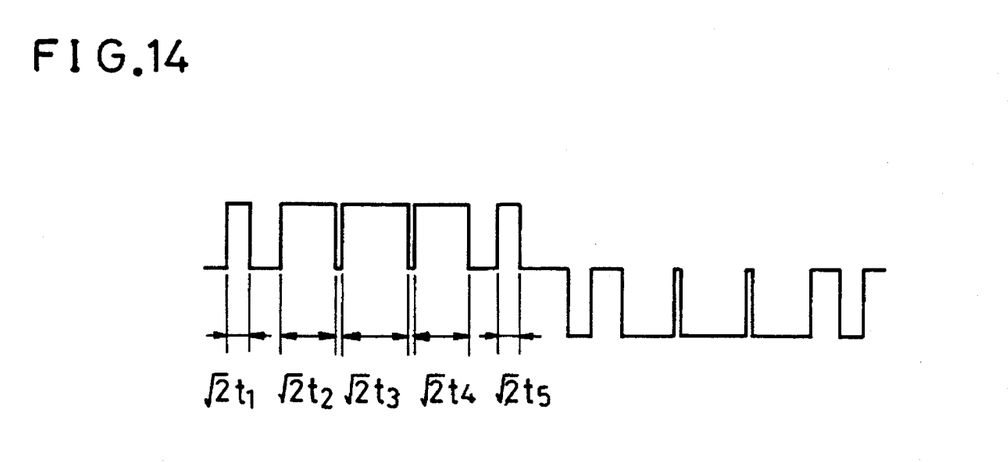

FIG. 14 is another graph showing a pseudo AC voltage waveform at the time when the voltage $V_{DC}$ is smaller than the DC voltage $V_{RDC}$. This waveform is based on the step 507 (FIG. 4). When the DC voltage $V_{DC}$ drops to 100 V, the waveform shown in FIG. 14 is issued. In this waveform, pulse height (amplitude) is 100/200 (=½) times as large as that in FIG. 5, and respective pulse-widths are √2 (=200/(√2×100)) times as large as the basic pulse-widths. That is, the pulse-widths are equal to those of the waveform shown in FIG. 13. However, an effective value $V_{AC}$ is lowered to approximately 70 V in this waveform.

Figure 8:
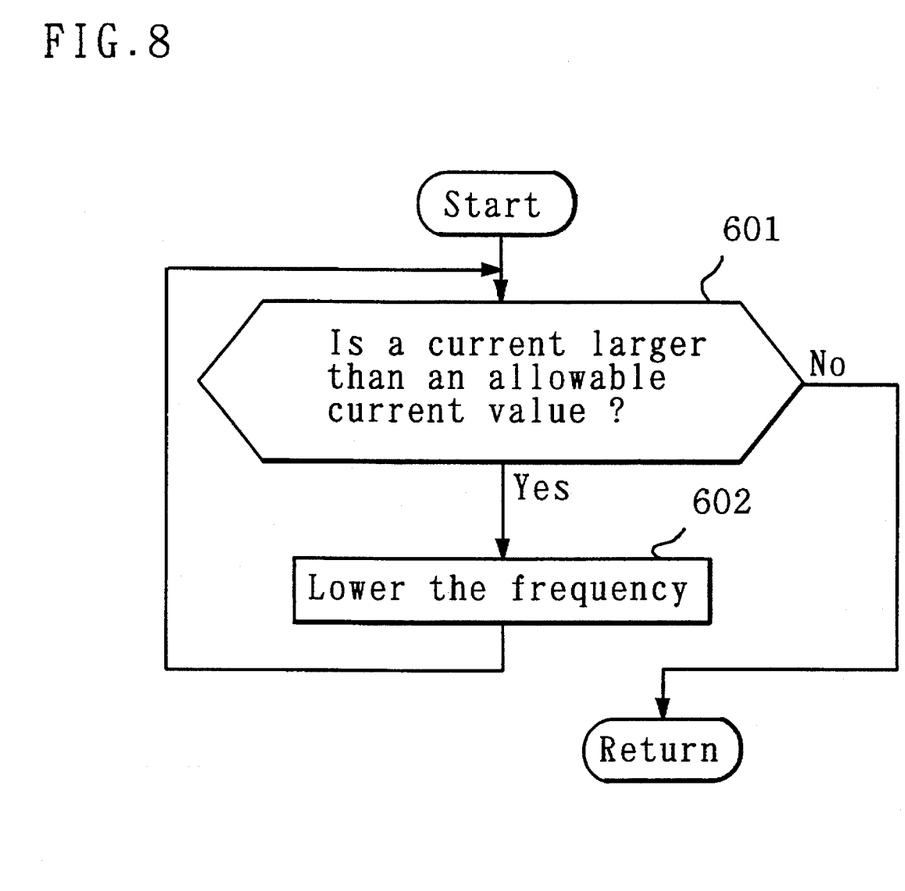
FIG. 8 is a flow chart showing a sub-routine of control operation for limiting current executed in the control circuit 6 (FIG. 1)

FIG. 8 is a flow chart showing a sub-routine of control operation for limiting current executed in the control circuit 6 (FIG. 1). In a step 601, judgment is made whether a current is larger than an allowable current value. When the current is larger than the allowable current, step advance to a step 602 is executed. In the step 602, frequency is lowered, and return to the step 601 is executed. These steps are repeated until the frequency reaches the allowable current, and thereafter return to the main routine is executed.

Figure 9:
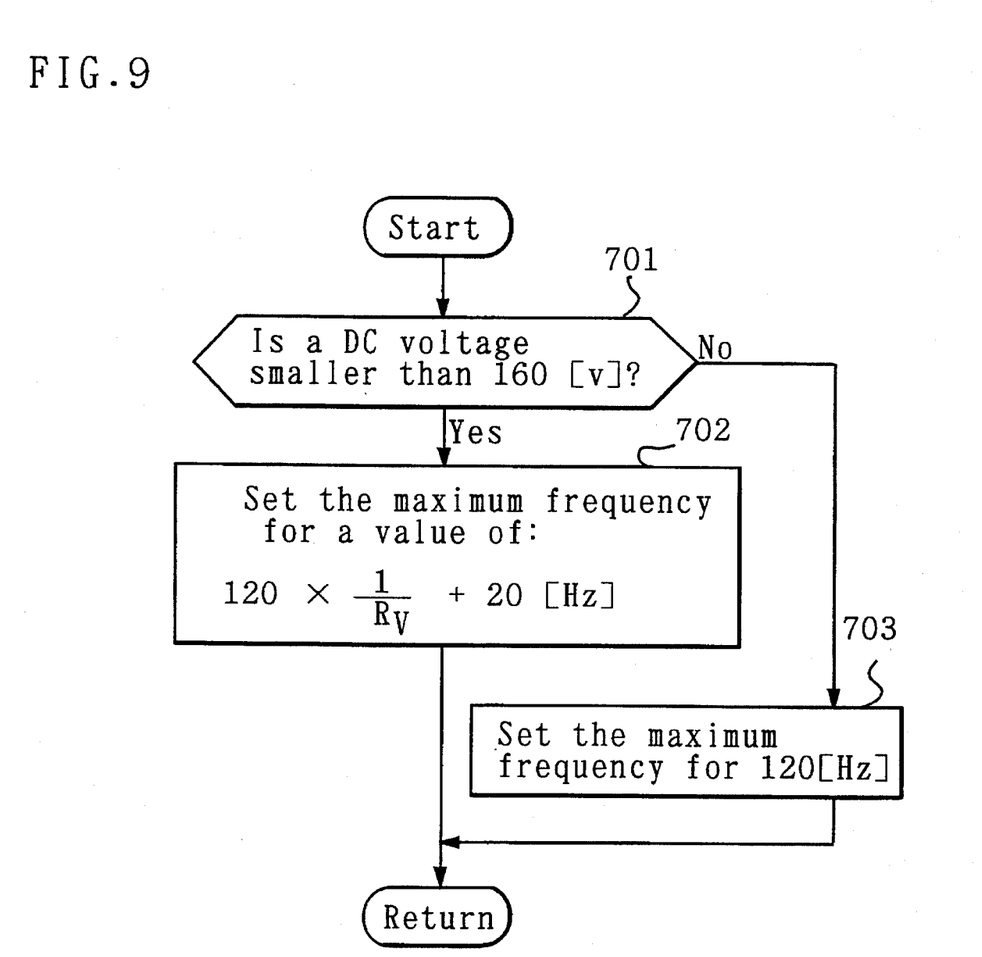
FIG. 9 is a flow chart showing a sub-routine of control operation for limiting the maximum frequency executed in the control circuit 6 (FIG. 1)

FIG. 9 is a flow chart showing a sub-routine of control operation for limiting the maximum frequency executed in the control circuit 6 (FIG. 1). In a step 701, judgment is made whether the DC voltage is smaller than 160 V. When the voltage is smaller than 160 V, step advance to a step 702 is executed. In the step 702, the maximum frequency is limited in response to the voltage $R_V$. That is, the maximum frequency is set for a value of:

120×(1/$R_V$)+20 [Hz].

When the voltage exceeds 160 V, the maximum frequency is fixedly set for a value of 120 Hz in a step 703.

The sub-routines shown in FIG. 8 and FIG. 9 can be combined with the sub-routine shown in FIG. 4.

Although in the above-mentioned description the DC power source is the battery, the present invention can be applied to an embodiment in which a DC generator is used instead of the battery.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An inverter apparatus for air conditioner, which converts DC voltage supplied from a DC power source into pseudo AC voltage of variable voltage and variable frequency by means of pulse-width modulation, comprising:

switching means for making switching operation to a DC voltage supplied thereto;

voltage detection means for detecting a DC voltage applied to said switching means; and control means for controlling said switching means to generate a pulse train whose pulse-width is modulated with a predetermined frequency-voltage characteristic; wherein said control means refers to pulse-widths of said pulse train for holding said frequency-voltage characteristic when said DC voltage is a nominal DC voltage of said DC power source, and said control means varies said pulse-widths in response to degree of variation of said DC voltage against said nominal DC voltage, and when said DC voltage has an insufficient value to obtain said frequency-voltage characteristic, said control means controls said switching means to issue a maximum AC voltage obtained by said value of the DC voltage independent of frequency.

2. The inverter apparatus for air conditioner in accordance with claim 1, further comprising:

current detection means for detecting a current flowing in said switching means, and wherein when said DC voltage has an insufficient value to obtain said frequency-voltage characteristic, said control means controls said switching means to lower frequency to thereby restrict said current below a predetermined value.

3. The inverter apparatus for air conditioner in accordance with claim 1, wherein when said DC voltage has an insufficient value to obtain said frequency-voltage characteristic, said control means controls said switching means to limit a maximum frequency in response to said DC voltage.

4. The inverter apparatus for air conditioner in accordance with claim 1, wherein said DC voltage is supplied from a battery for driving an electric vehicle.

5. The inverter apparatus for air conditioner in accordance with claim 1, wherein said DC voltage is supplied from a DC generator mounted in an automobile.

* * * * *